(12) United States Patent
Short et al.

(10) Patent No.: US 11,538,184 B2
(45) Date of Patent: Dec. 27, 2022

(54) SUBSTANTIALLY REAL-TIME CORRECTION OF PERSPECTIVE DISTORTION

(71) Applicant: Hewlett-Packard Development Company, L.P., Spring, TX (US)

(72) Inventors: David Bradley Short, San Diego, CA (US); Yun David Tang, Spring, TX (US); Hao Meng, San Diego, CA (US); Vijaykumar Nayak, San Diego, CA (US); Santiago Garcia-Reyero Vinas, San Diego, CA (US); Xiangfei Qian, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 15 days.

(21) Appl. No.: 17/048,124

(22) PCT Filed: Jun. 1, 2018

(86) PCT No.: PCT/US2018/035574
§ 371 (c)(1),
(2) Date: Oct. 16, 2020

(87) PCT Pub. No.: WO2019/231462
PCT Pub. Date: Dec. 5, 2019

(65) Prior Publication Data
US 2021/0192770 A1    Jun. 24, 2021

(51) Int. Cl.
*G06T 7/70*     (2017.01)
*G06T 5/00*     (2006.01)

(52) U.S. Cl.
CPC .............. *G06T 7/70* (2017.01); *G06T 5/006* (2013.01); *G06T 2207/10028* (2013.01); *G06T 2207/30244* (2013.01)

(58) Field of Classification Search
CPC . G06T 7/70; G06T 5/006; G06T 2207/10028; G06T 2207/30244; G06T 7/73; G06T 2207/10048
USPC .......................................................... 382/103
See application file for complete search history.

(56) References Cited

U.S. PATENT DOCUMENTS

| | | | |
|---|---|---|---|
| 9,762,871 B2 * | 9/2017 | De La Cruz | H04N 9/3185 |
| 2012/0218444 A1 | 8/2012 | Stach | |
| 2012/0300020 A1 * | 11/2012 | Arth | G06T 7/75 |
| | | | 348/E7.001 |
| 2013/0094764 A1 | 4/2013 | Campbell | |

(Continued)

FOREIGN PATENT DOCUMENTS

| | | | | |
|---|---|---|---|---|
| CN | 104778697 | * | 7/2015 | ............... G06T 7/00 |
| CN | 106954053 A | | 7/2017 | |

OTHER PUBLICATIONS

Hewlett-Packard Development Company, L.P., PageLift Keystone Correction, Nov. 2013, 2 pages.

*Primary Examiner* — Jerome Grant, II
(74) *Attorney, Agent, or Firm* — Quarles & Brady LLP

(57) ABSTRACT

An example system includes a pose engine to determine a pose of a camera based on an environmental measurement. The system also includes a transform engine to determine a transform to apply to frames captured by the camera based on the pose of the camera. The system includes a correction engine to apply the transform to the frames captured by the camera in substantially real-time with capturing of the frames.

14 Claims, 6 Drawing Sheets

(56) References Cited

U.S. PATENT DOCUMENTS

| | | | |
|---|---|---|---|
| 2016/0379373 A1* | 12/2016 | Givon | G06T 7/20 |
| | | | 382/103 |
| 2017/0039721 A1* | 2/2017 | Kropf | G06T 7/50 |
| 2017/0150123 A1 | 5/2017 | Chen et al. | |
| 2017/0262979 A1* | 9/2017 | Xiong | G06T 7/0012 |
| 2017/0289516 A1 | 10/2017 | Svortdal et al. | |
| 2018/0247429 A1* | 8/2018 | Chandraker | G05D 1/0253 |
| 2018/0322688 A1* | 11/2018 | Ozguner | G06T 3/0093 |
| 2019/0146313 A1* | 5/2019 | De La Cruz | H04N 9/3185 |
| | | | 345/581 |
| 2021/0019912 A1* | 1/2021 | Cutler | G06T 5/006 |
| 2021/0183165 A1* | 6/2021 | Zheng | G06T 7/75 |
| 2021/0295599 A1* | 9/2021 | Adkinson | G06N 3/04 |

* cited by examiner

FIG. 3

Detect a Change in a Pose of a Camera
302

Communicate with a Sensor Other Than the Camera
304

Determine a Correction for Perspective Distortion for the Camera Based on the Communication with the Sensor
306

Correct the Perspective Distortion in Frames Captured by the Camera in Substantially Real-Time with Capturing of the Frames
308

SUBSTANTIALLY REAL-TIME CORRECTION OF PERSPECTIVE DISTORTION

BACKGROUND

A computing device may include a camera. The camera may capture image frames and provide the frames in a digital format to the computing device. The computing device may include a desktop computer, a thin client, a notebook, a tablet, a smart phone, a wearable, or the like. The computing device may include a processor, volatile or non-volatile storage, a display, or a network connection. The computing device may store the frames captured by the camera, display the frames on the display, transmit the frames to remotely located computing devices using the network connection (e.g., for storage or display on the remotely located computing devices), or the like.

BRIEF DESCRIPTION OF THE DRAWINGS

FIG. 3 is a flow diagram of an example method to correct perspective distortion in frames in substantially real-time with capturing of the frames.

DETAILED DESCRIPTION

Figure 1:
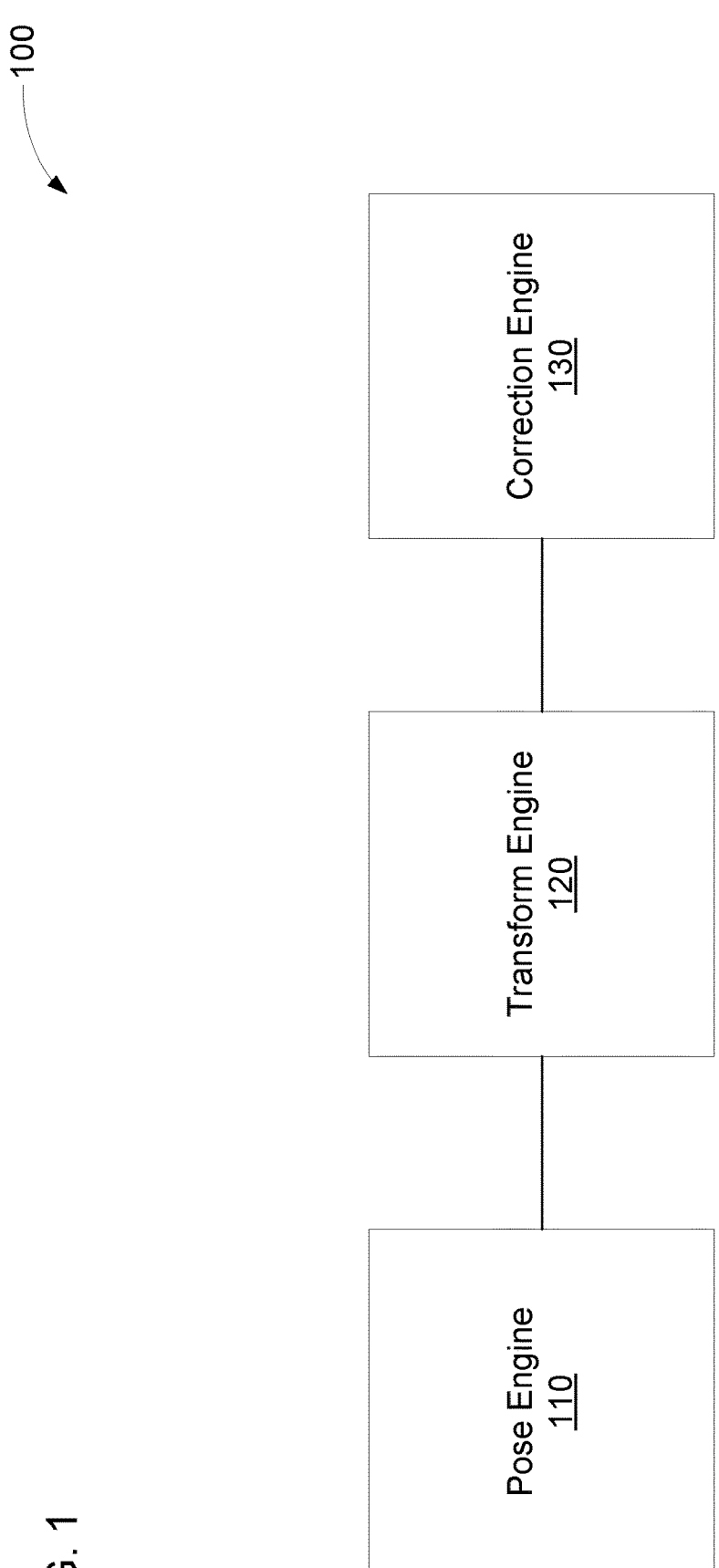
FIG. 1 is a block diagram of an example system to correct perspective distortion in frames in substantially real-time with capturing of the frames.

A computing device may include a camera that is aimed at a workspace. For example, the camera may be mounted on or incorporated into a display of the computing device (e.g., a display included in a notebook, tablet, or smart phone; a display connected to but separate from a desktop or thin client; etc.). The workspace may include a desk, a portion of the computing device (e.g., a touchpad, a projection target, or the like). In an example, the workspace may be generally planar. The camera may record frames of objects on the workspace. The objects may be three-dimensional objects, or the objects may be two-dimensional objects, such as documents. As used herein, the term "frame" refers to an image captured by the camera. The frame may be a stand-alone frame or may be a frame from a video. The frame may be generated based on measurements of visible light, measurements of infrared light, measurements of reflections of ultrasonic waves, depth measurements, or the like and may include a two-dimensional array of the measurements.

The camera may be positioned at an unknown angle relative to the workspace. For example, a planar workspace may have a normal vector corresponding to the plane, and the camera angle may be offset from the normal vector. As a result, the camera may not have an orthographic view of the workspace. The angle of the camera may introduce perspective distortion relative to the orthographic view of the workspace. For example, the shape of two-dimensional or three-dimensional objects may be distorted relative to the orthographic view. In an example, the camera may capture a frame of a rectangular document, but the rectangular document may appear as a non-rectangular quadrilateral in the captured frame. In addition, if the computing device shares the document with a remote computing device, the document may be flipped (e.g., upside down) as well as being distorted.

The camera may provide the frame to the computing device, and the computing device may correct the perspective distortion. For example, the computing device may analyze the frame or other measurements to determine the perspective distortion. The computing device may determine a correction that compensates for the perspective distortion and apply the correction to the frame. However, the computing device may take longer to determine and apply the correction than the period between adjacent frames. The period between adjacent frames refers to the time between when the camera captures a particular frame and when the camera captures another frame immediately following the particular frame. The period may be an inverse of the frame rate for the camera. Because the computing device takes longer to determine and apply the correction than the period between frames, the computing device may be unable to correct perspective distortion in the frames in substantially real-time. A system that corrects perspective distortion in substantially real-time may be able to provide perspective corrected video. For example, such a system may allow perspective corrected video to be transmitted over a network to remote users, thus improving the experience of the remote users. In an example, the system may transmit perspective corrected video of a document to remote users to allow the remote users to collaborate on the document without viewing the effects of perspective distortion.

FIG. 1 is a block diagram of an example system 100 to correct perspective distortion in frames in substantially real-time with capturing of the frames. The system 100 may include a pose engine 110. As used herein, the term "engine" refers to hardware (e.g., a processor, such as an integrated circuit or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or executed or interpreted by a processor), or hardware and software hosted at hardware.

The pose engine 110 may determine a pose of a camera based on an environmental measurement. As used herein, the term "pose" refers to the direction the camera is facing. The pose may be determined relative to a workspace, relative to an orthographic view of the workspace, relative to an object in the field of view of the camera, or the like. The pose of the camera may not be known in advance to the pose engine 110. In an example, the environmental measurements may be indirectly indicative of the pose of the camera. The pose engine 110 may calculate the pose based on the environmental measurements. The pose engine 110 may calculate the pose by calculating an angle of the camera, by calculating a set of values corresponding to a unique pose, or the like.

The system 100 may also include a transform engine 120. The transform engine 120 may determine a transform to apply to frames captured by the camera based on the pose of the camera. For example, the transform engine 120 may determine a transform that can be applied to the frames captured by the camera to remove perspective distortion from the frames. The transform engine 120 use the pose of the camera as determined by the pose engine 110 to determine what transform will appropriately correct frames captured by the camera.

The system 100 may include a correction engine 130. The correction engine 130 may apply the transform to the frames captured by the camera in substantially real-time with capturing of the frames. As used herein, the term "substantially real-time" refers to an operation that outputs frames at a rate at least as fast as the rate at which frames are captured. For example, substantially real-time may refer to an operation performed in less time than the period between adjacent frames, or substantially real-time may refer to an operation that is pipelined or parallelized to allow frames to be output at the frame rate despite an operation taking longer than the period between adjacent frames. The frame rate may be a frame rate large enough to create the perception of motion to a user, such as a frame rate of at least or more than 10 frames per second (fps), 24 fps, 25 fps, 30 fps, 48 fps, 50 fps, 60 fps, or the like. The correction engine 130 may apply the transform by computing a new frame based on the transform and values of pixels in a frame captured by the camera.

Figure 2:
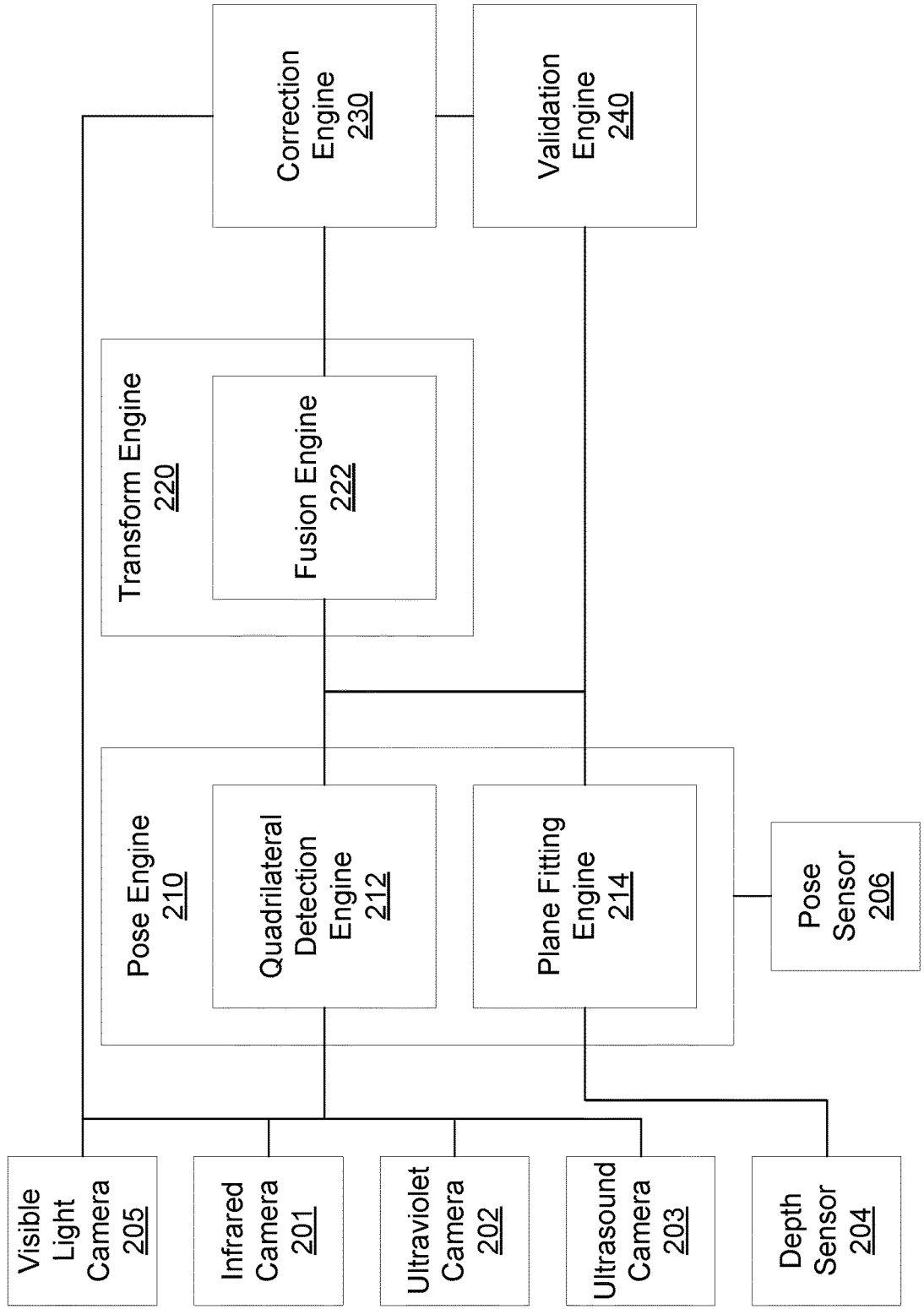
FIG. 2 is a block diagram of another example system to correct perspective distortion in frames in substantially real-time with capturing of the frames.

FIG. 2 is a block diagram of another example system 200 to correct perspective distortion in frames in substantially real-time with capturing of the frames. The system 200 may include a camera 205 to capture frames. The system 200 may also include a pose engine 210. The pose engine 210 may determine a pose of the camera 205 based on an environmental measurement. Various environmental measurements may be used to determine the pose. In an example, the environmental measurements may include measurements of visible light by the camera 205. The pose engine 210 may include a quadrilateral detection engine 212 to detect a quadrilateral in a frame captured by the camera 205. For example, the quadrilateral detection engine 212 may identify edges or corners of the quadrilateral. The quadrilateral detection engine 212 may determine coordinates for the edges or corners of the quadrilateral. In an example, the coordinates may indicate the pose of the camera (e.g., the deviation of the coordinates from those of a rectangle), so the pose engine 210 may determine the pose of the camera by determining the coordinates. In some examples, the pose engine 210 may determine the pose by determining an angle of the camera based on the coordinates.

In some examples, the environmental measurement may be measurements of nonvisible electromagnetic radiation. For example, the system 200 may include an infrared camera 201 that captures frames based on measurements of infrared radiation or an ultraviolet camera 202 that captures frames based on measurements of ultraviolet radiation. The environmental measurement may be measurements of sound waves, such as ultrasonic sound waves. The system 200 may include an ultrasound camera 203 that captures frames based on transmitting ultrasound and measuring the reflected ultrasounds. The quadrilateral detection engine 212 may detect a quadrilateral in a frame captured by the infrared camera 201, the ultraviolet camera 202, or the ultrasound camera 203. The pose engine 210 may determine a pose of the infrared camera 201, the ultraviolet camera 202, or the ultrasound camera 203 based on the quadrilateral captured by the camera. For example, the quadrilateral may correspond to a rectangle under an orthographic view of the workspace, and the pose engine 210 may determine the pose based on how much the quadrilateral deviates from a rectangle. The pose engine 210 may determine the pose of the visible light camera 205 based on the pose of the infrared camera 201, the ultraviolet camera 202, or the ultrasound camera 203.

The environmental measurement may be depth measurements. For example, the system 200 may include a depth sensor 204, such as a time of flight sensor, a structured light sensor, a stereo depth sensor, or the like. The pose engine 210 may include a plane fitting engine 214 to detect a plane in the measurements by the depth sensor 204. The plane fitting engine 214 may determine a best fit function for the detected plane. In some examples, the depth sensor 204 may detect objects other than the plane. The plane fitting engine 214 may segment out objects other than the plane to improve the accuracy of the plane fitting. In some examples, the plane fitting engine 214 may determine a best fit function for the plane based on an average. The pose engine 210 may determine a pose of the depth sensor 204 based on the function of the plane. The pose engine 210 may determine the pose of the visible light camera 205 based on the pose of the depth sensor 204.

In an example, the pose of the visible light camera 205 relative to the infrared camera 201, the ultraviolet camera 202, the ultrasound camera 203, or the depth sensor 204 may be known. For example, the relative poses may be determined during factory calibration. Accordingly, the pose engine 210 may add the relative pose to the pose determined for the infrared camera 201, the ultraviolet camera 202, the ultrasound camera 203, or the depth sensor 204 to compute the pose of the visible light camera 205. In some examples, the relative poses may be determined after manufacture. For example, the pose engine 210 may compare frames captured by the visible light camera 205 to frames captured by the infrared camera 201, the ultraviolet camera 202, or the ultrasound camera 203. The pose engine 210 may detect an object in the captured frames and determine the relative pose based on the difference in the orientation of the object in the captured frames. The pose engine 210 may determine the pose of the visible light camera 205 based on the determined relative pose and the pose of the infrared camera 201, ultraviolet camera 202, the ultrasound camera 203, or the depth sensor 204.

The pose engine 210 may determine the pose of the camera 205 in response to detecting a change in the pose of the camera 205. For example, the system 200 may include a pose sensor 206 to detect changes in the pose of the camera 205. The pose sensor 206 may include an accelerometer, a gyroscope, a magnetometer, or the like to detect the change in the pose of the camera 205. In some examples, the pose engine 210 may detect the change in the pose of the camera 205 based on measurements from the infrared camera 201, the ultraviolet camera 202, the ultrasound camera 203, the depth sensor 204, the visible light camera 205, or the like. The pose engine 210 may detect a translation or more than a threshold change in content in an image from the visible light camera 205, the infrared camera 201, the ultraviolet camera 202, the ultrasound camera 203, etc. or in the measurements from the depth sensor 204 or the like. In an example, the pose engine 210 may update a determination of the pose in response to detecting the change in the pose but not update the determination when a change is not detected.

The system 200 may include a transform engine 220. The transform engine 220 may determine a transform to apply to frames captured by the visible light camera 205 based on the pose of the visible light camera 205. For example, the transform engine 220 may determine a transform that results in an orthographic view of the workspace. The transform engine 220 may compute a homographic transform that when applied to the captured frames produces the orthographic view of at least a portion of the captured frames. The transform engine 220 may determine the transform based on a detected quadrilateral or a best fit function of a plane. For example, the transform engine 220 may determine a transform that maps the quadrilateral to a rectangle, that rotates the plane to have a normal vector parallel to a direction into or out of the visible light camera 205, or the like while accounting for the relative pose between the visible light camera 205 and the sensor that captured a frame including the quadrilateral or plane.

The transform engine 220 may include a fusion engine 222. The transform engine 220 may compute the transform based on the measurements from multiple sensors (e.g., multiple ones of the infrared camera 201, the ultraviolet camera 202, the ultrasound camera 203, the depth sensor 204, etc.). For example, the transform engine 220 may compute an estimate of the transform for each sensor. The fusion engine 222 may combine the estimates of the transform from the various sensors to produce a final calculation of the transform. In some examples, the fusion engine 222 may combine estimates of the pose for each of the various sensors to produce a final calculation of the pose, and the transform engine 220 may determine the transform based on the final calculation of the pose. The fusion engine 222 may combine the transforms or the poses by computing an arithmetic or geometric mean, a median, or the like.

The fusion engine 222 may apply different weights to the transforms or the poses when combining them. For example, the quadrilateral detection engine 212 or the plane fitting engine 214 may determine a confidence for a determined transform or pose, and the fusion engine 222 may determine the weights based on the confidence. The quadrilateral detection engine 212 may determine the confidence based on how well a shape fits a quadrilateral, whether there are multiple quadrilaterals or whether the multiple quadrilaterals are consistent, whether the quadrilateral varies over time, an amount of noise, or the like. The plane fitting engine 214 may determine the confidence based on the number of points on the plane, whether the plane varies over time, an amount of noise, or the like. In some examples, the fusion engine 222 may disregard a result with a confidence below a threshold, or a user may be prompted to remove objects in a field of view or to adjust the infrared camera 201, the ultraviolet camera 202, the ultrasound camera 203, the depth sensor 204, or the visible light camera 205.

The system 200 may include a correction engine 230. The correction engine 230 may apply the transform to the frames captured by the visible light camera 205 in substantially real-time with capturing of the frames. For example, the transform may be a matrix, a function, or the like. The correction engine 230 may be able to rapidly apply the transform to the captured frames to create transformed frames. The correction engine 230 may be able to apply the transform in less time than the period between adjacent frames. Accordingly, the correction engine 230 may output the transformed frames at the same frame rate as the frames are captured. There may be an initial delay between when the visible light camera 205 begins capturing frames and when the correction engine 230 begins outputting transformed frames.

In some examples, the transform engine 220 may determine an updated transform for each frame to which a transform is to be applied. For example, the infrared camera 201, the ultraviolet camera 202, the ultrasound camera 203, or the depth sensor 204 may capture frames at the same rate or faster than the visible light camera, and the pose engine 210 and the transform engine 220 may determine updated poses and transforms in less time than the period between adjacent frames. In other examples, the transform engine 220 may determine updated transforms at a slower rate than the frame rate of captured frames. For example, the infrared camera 201, the ultraviolet camera 202, the ultrasound camera 203, or the depth sensor 204 may capture frames at a slower rate than the visible light camera 205, or the pose engine 210 or the transform engine 220 may determine updated poses or transforms in more time than the period between adjacent frames. The correction engine 230 may continue to apply a current transform to frames captured by the visible light camera 205 until an updated transform is received.

In an example, the pose engine 210 or the transform engine 220 may determine that the transform should be updated based on detecting an event. For example, the pose engine 210 or the transform engine 220 may determine that the infrared camera 201, the ultraviolet camera 202, the ultrasound camera 203, the depth sensor 204, or the visible light camera 205 has moved, that a time threshold has been exceeded, or the like. The pose engine 210 may determine that a quadrilateral in a captured frame has moved more than a threshold distance (e.g., a coordinate of an edge or corner has moved more than a threshold distance, a plurality of coordinates have moved more than a threshold distance, or the like), that a fitted plane in a captured frame has moved more than a threshold distance, or the like. The pose engine 210 may determine that more than a threshold number of pixels have changed by more than a threshold amount. The infrared camera 201, the ultraviolet camera 202, the ultrasound camera 203, the depth sensor 204, or the visible light camera 205 may include or may be mechanically coupled to an accelerometer, a gyroscope, or a magnetometer, such as the pose sensor 206, to detect movement. Based on detecting the event (e.g., detecting movement, detecting a time threshold being exceeded, etc.), the pose engine 210 may determine an updated pose of the camera, and the transform engine 220 may determine an updated transform. The correction engine 230 may apply the updated transform to frames captured by the visible light camera 205 once the updated transform has been received.

The correction engine 230 may correct perspective distortion in the infrared camera 201, the ultraviolet camera 202, the ultrasound camera 203, or the depth sensor 204 instead of, or in addition to, the visible light camera 205. The correction engine 230 may correct the perspective distortion based on quadrilaterals or planes detected by any of the infrared camera 201, the ultraviolet camera 202, the ultrasound camera 203, the depth sensor 204, or the visible light camera 205 and the relative poses of the infrared camera 201, the ultraviolet camera 202, the ultrasound camera 203, the depth sensor 204, or the visible light camera 205. In an example, the correction engine 230 may compute the perspective distortion correction the infrared camera 201, the ultraviolet camera 202, the ultrasound camera 203, or the depth sensor 204 based on the pose of the visible light camera 205 determined by the pose engine 210 and relative pose information.

The system 200 may include a validation engine 240. The validation engine 240 may confirm the transform computed by the transform engine 220 correctly transforms the image. For example, the validation engine 240 may confirm that a quadrilateral detected by any of the infrared camera 201, the ultraviolet camera 202, the ultrasound camera 203, the depth sensor 204, or the visible light camera 205 is transformed to a rectangle. In an example, the transform engine 220 may compute the transform based on environmental measurements by the infrared camera 201, the ultraviolet camera 202, the ultrasound camera 203, or the depth sensor 204, and the validation engine 240 may validate the transform based on environmental measurements by the visible light camera 205.

In some examples, the visible light camera 205 may include the pose engine 210, the transform engine 220, the correction engine 230, or the validation engine 240. The pose engine 210 or the transform engine 220 may be able to determine the pose or transform faster, or the correction engine 230 may be able to apply the correction faster than a computing device that includes or is communicatively coupled to the visible light camera 205 (e.g., a processor in the visible light camera 205 may be faster than a central processing unit, which may share resources and have overhead). In an example, the visible light camera 205 may include a digital signal processor to rapidly apply the transform to the captured frames. The visible light camera 205 may output the transformed frames to the computing device (e.g., the central processing unit of the computing device) that includes or is communicatively coupled to the visible light camera 205 without the computing device performing additional calculations to transform the captured frames. In an example, a computing device communicatively coupled to the visible light camera 205 may include the pose engine 210, the transform engine 220, the correction engine 230, or the validation engine 240.

FIG. 3 is a flow diagram of an example method 300 to correct perspective distortion in frames in substantially real-time with capturing of the frames. A processor may perform the method 300. At block 302, the method 300 may include detecting a change in a pose of a camera. The change in pose may be detected based on movement of the camera, movement of objects in frames captured by the camera, or the like. Detecting the change in the pose of the camera may include detecting that the change in the pose or the camera exceeds a threshold.

Block 304 may include communicating with a sensor other than the camera. The sensor may capture environmental measurements of the area around the sensor. Communicating with the sensor may include requesting or receiving environmental measurements collected by the sensor, information about properties of the sensor, or the like.

At block 306, the method 300 may include determining a correction for perspective distortion for the camera based on the communication with the sensor. For example, the correction may convert a non-orthographic view of a scene captured by the camera into an orthographic view of the scene. The amount of correction to covert the non-orthographic view into the orthographic view may be determined based on the measurements communicated by the sensor.

Block 308 may include correcting the perspective distortion in frames captured by the camera in substantially real-time with the capturing of the frames. For example, the correction determined in block 306 may be applied to the frames captured by the camera. The corrected frames may be output at a frame rate equal to or substantially equal to the frame rate at which frames are captured. Referring to FIG. 1, in an example, the pose engine 110 may perform block 302 or 304; the transform engine 120 may perform block 306; and the correction engine 130 may perform block 308.

Figure 4:
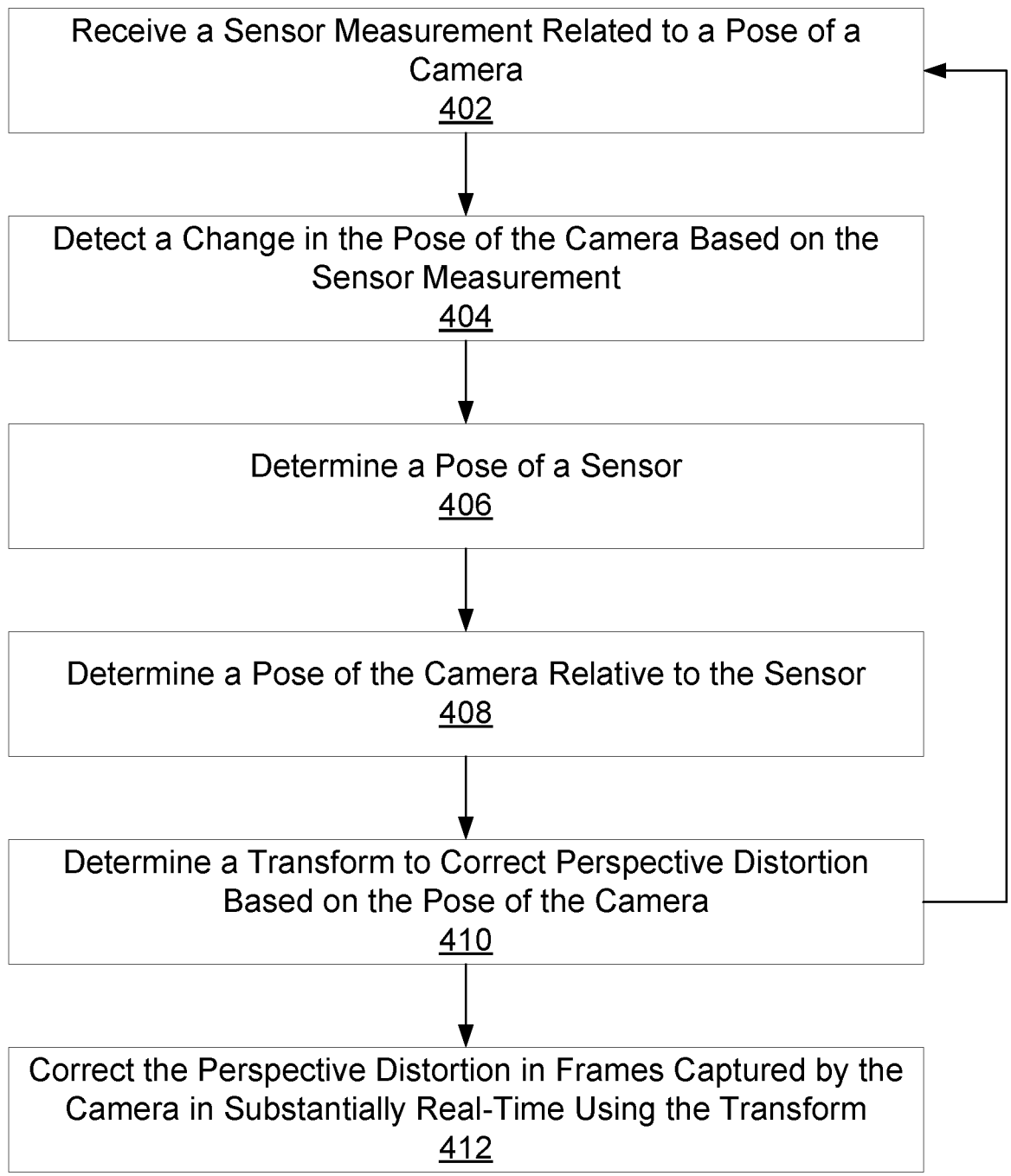
FIG. 4 is a flow diagram of another example method to correct perspective distortion in frames in substantially real-time with capturing of the frames.

FIG. 4 is a flow diagram of another example method 400 to correct perspective distortion in frames in substantially real-time with capturing of the frames. A processor may perform the method 400. At block 402, the method 400 may include receiving a sensor measurement related to a pose of a camera (e.g., a visible light camera, an infrared camera, an ultraviolet camera, an ultrasound camera, etc.). The sensor providing the sensor measurement may include an accelerometer, a gyroscope, a magnetometer, or the like. In some examples, the sensor may include a visible light camera, an infrared camera, an ultraviolet camera, an ultrasound camera, a depth sensor, or the like. In some examples, the sensor may be the camera.

Block 404 may include detecting a change in the pose of the camera based on the sensor measurement. For example, detecting the change in the pose may include detecting more than a threshold amount of movement based on measurements from the accelerometer, gyroscope, magnetometer, etc. Detecting the change in the pose may include more than a threshold change in a quadrilateral detected in an image from the visible light camera, the infrared camera, the ultraviolet camera, the ultrasound camera, etc. or in a fitted plane detected in measurements from the depth sensor or the like. Detecting the change in pose may include detecting a translation of content in the image from the visible light camera, the infrared camera, the ultraviolet camera, the ultrasound camera, etc. or in the measurements from the depth sensor or the like.

At block 406, the method 400 may include determining a pose of a sensor. The sensor to determine the pose may be the same as or different from the sensor to detect the change in the pose. In some examples, the sensor is distinct from the camera (e.g., the sensor is not the camera). Determining the pose may include detecting a quadrilateral in an image captured by the sensor, fitting a plane in measurements detected by the sensor, or the like as discussed in more detail previously.

Block 408 may include determining the pose of the camera relative to the pose of the sensor. The pose of the camera relative to the pose of the sensor may have been determined previously (e.g., during a factory or previous user calibration). Determining the relative pose may include retrieving a previously determined relative pose from a non-transitory computer readable medium. In some examples, the relative pose may not have been previously determined. Determining the relative pose may include comparing images captured by the sensor and the camera to determine differences in the perspectives of the sensor and the camera.

At block 410, the method 400 may include determining a correction for perspective distortion of the camera based on the pose of the camera. For example, block 410 may include determining a transform to apply to the frames to correct the perspective distortion. The transform may be determined based on the pose of the camera as discussed in more detail previously.

At block 412, the method 400 may include correct the perspective distortion in the frames captured by the camera in substantially real-time with capturing of the frames. The frames may be corrected using the transform until an updated transform is determined in response to another change in the pose of the camera. For example, the method 400 may continue to blocks 402 and 412 from block 410. While block 412 is performed to correct frames in substantially real-time with receipt of those frames, blocks 402-410 may be performed to generate an updated transform. When an updated transform is determined at block 410, the updated transform may be used at block 412 to correct the perspective distortion. Otherwise, the previous transform may continue to be used at block 412 until the updated transform has been determined. In an example, the pose engine 210 of FIG. 2 may perform block 402, 404, 406, or 408; the transform engine 220 may perform block 410; and the correction engine 230 may perform block 412.

Figure 5:
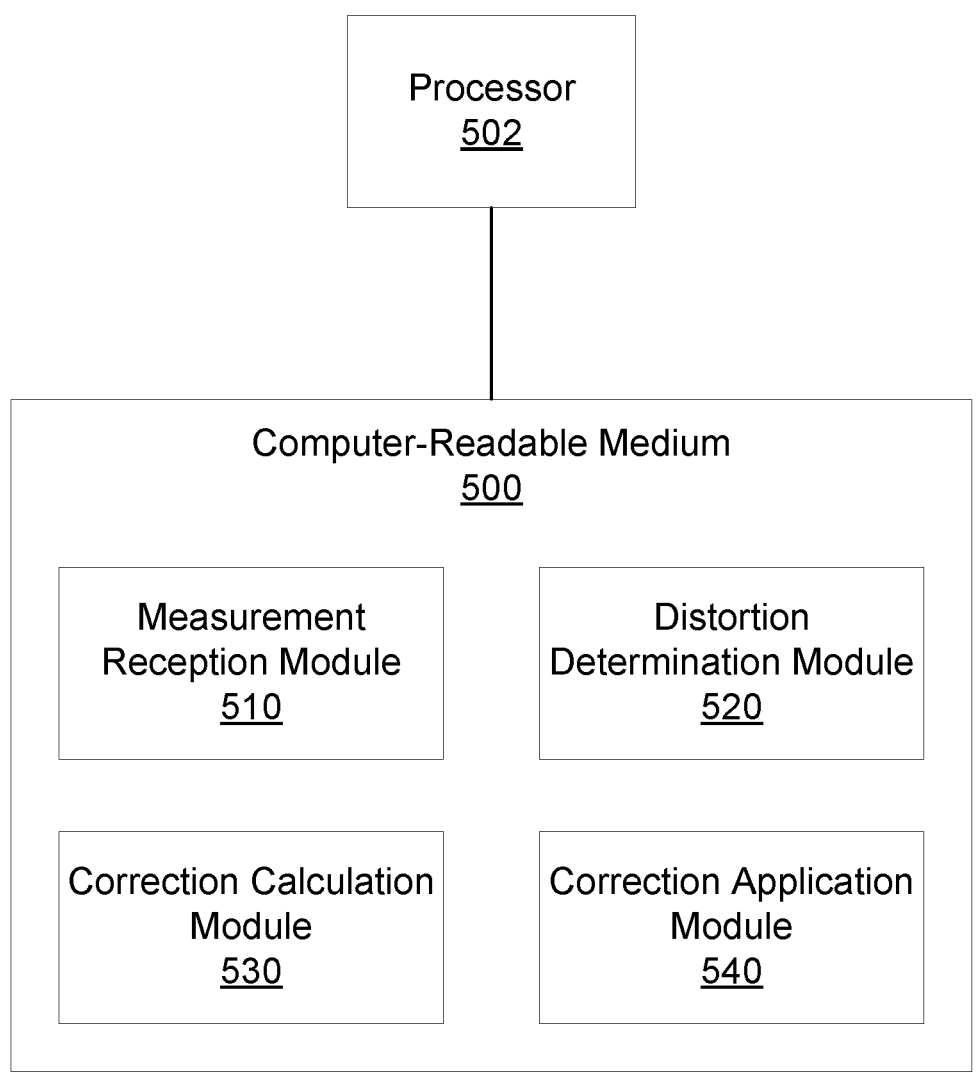
FIG. 5 is a block diagram of an example computer-readable medium including instructions that cause a processor to correct perspective distortion in frames in substantially real-time with capturing of the frames.

FIG. 5 is a block diagram of an example computer-readable medium 500 including instructions that, when executed by a processor 502, cause the processor 502 to correct perspective distortion in frames in substantially real-time with capturing of the frames. The computer-readable medium 500 may be a non-transitory computer-readable medium, such as a volatile computer-readable medium (e.g., volatile RAM, a processor cache, a processor register, etc.), a non-volatile computer-readable medium (e.g., a magnetic storage device, an optical storage device, a paper storage device, flash memory, read-only memory, non-volatile RAM, etc.), and/or the like. The processor 502 may be a general-purpose processor or special-purpose logic, such as a microprocessor (e.g., a central processing unit, a graphics processing unit, etc.), a digital signal processor, a microcontroller, an ASIC, an FPGA, a programmable array logic (PAL), a programmable logic array (PLA), a programmable logic device (PLD), etc.

The computer-readable medium 500 may include a measurement reception module 510. As used herein, a "module" (in some examples referred to as a "software module") is a set of instructions that when executed or interpreted by a processor or stored at a processor-readable medium realizes a component or performs a method. The measurement reception module 510 may include instructions that, when executed, cause the processor 502 to receive measurements from a sensor. For example, the measurement reception module 510 may cause the processor 502 to receive an image, an array of depth measurements, or the like from the sensor.

The computer-readable medium 500 may include a distortion determination module 520. The distortion determination module 520 may cause the processor 502 to determine a perspective distortion of a camera resulting from a pose of the camera based on measurements from a sensor. For example, the distortion determination module 520 may cause the processor 502 to detect a quadrilateral in an image, determine the best fit of a plane, or the like to determine the perspective distortion. The distortion determination module 520 may cause the processor 502 to determine the perspective distortion by determining coordinates for edges or corners of the quadrilateral, by determining a normal vector, a coordinate, or the like to represent the best fit of the plane, or the like. In some examples, the distortion determination module 520 may cause the processor 502 to determine the pose of the camera relative to the pose of the sensor to determine the perspective distortion based on the measurements from the sensor.

The computer-readable medium 500 may include a correction calculation module 530. The correction calculation module 530 may cause the processor 502 to calculate a correction to the perspective distortion. The correction calculation module 530 may cause the processor 502 to determine a correction that, when applied to frames captured by the camera, causes the frames to appear to have been captured from an orthographic view. The correction calculation module 530 may cause the processor 502 to determine the correction based on the perspective distortion determined by the distortion determination module 520.

The computer-readable medium 500 may include a correction application module 540. The correction application module 540 may cause the processor 502 to apply the correction to frames captured by the camera in substantially real-time with capturing of the frames. For example, the correction application module 540 may cause the processor 502 to correct the frames in less time than the period between adjacent frames. In an example, when executed by the processor 502, the measurement reception module 510 or the distortion determination module 520 may realize the pose engine 110 of FIG. 1; the correction calculation module 530 may realize the transform engine 120; and the correction application module 540 may realize the correction engine 130.

Figure 6:
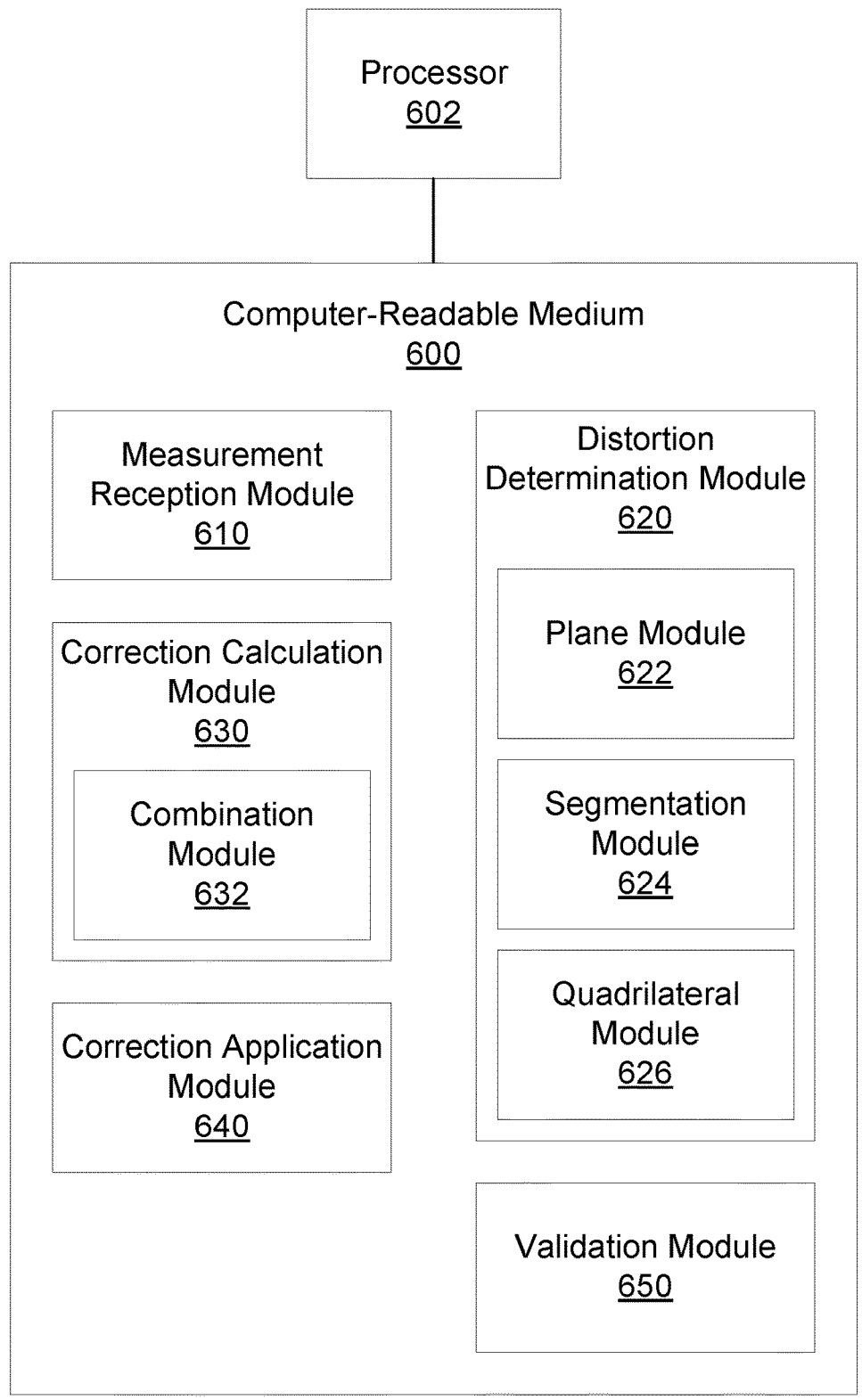
FIG. 6 is a block diagram of another example computer-readable medium including instructions that cause a processor to correct perspective distortion in frames in substantially real-time with capturing of the frames.

FIG. 6 is a block diagram of another example computer-readable medium 600 including instructions that, when executed by a processor 602, cause the processor 602 to correct perspective distortion in frames in substantially real-time with capturing of the frames. The computer-readable medium 600 may include a measurement reception module 610. The measurement reception module 610 may cause the processor 602 to receive measurements from a sensor. The measurement reception module 610 may cause the processor 602 to communicate with an infrared camera, an ultraviolet camera, an ultrasound camera, a depth sensor, a visible light camera, or the like to receive measurements, such as an image, an array of depth sensor measurements, or the like.

The computer-readable medium 600 may include a distortion determination module 620. The distortion determination module 620 may cause the processor 602 to determine a perspective distortion of a camera resulting from a pose of the camera based on the measurements. For example, the distortion determination module 620 may include a plane module 622. The plane module 622 may cause the processor 602 to determine a best-fit function of a plane based on measurements received from a depth sensor (e.g., by the measurement reception module 610). The plane module 622 may cause the processor 602 to determine the perspective distortion by determining a description of the plane, such as a normal vector, a coordinate, or the like for the plane.

The distortion determination module 620 may include a segmentation module 624. The segmentation module 624 may cause the processor 602 to segment measurements from the depth sensor to remove non-planar objects from the measurements. For example, the non-planar objects may introduce error to the best-fit function for the plane. The segmentation module 624 may cause the processor 602 to distinguish measurements associated with non-planar objects from measurements associated with planar objects. The segmentation module 624 may cause the processor 602 to provide the measurements associated with the planar objects to the plane module 622 without providing the measurements associated with the non-planar objects.

The distortion determination module 620 may include a quadrilateral module 626. The quadrilateral module 626 may cause the processor 602 to detect a first quadrilateral in an image. For example, the measurement reception module 610 may cause the processor 602 to receive the image from the infrared camera, the ultraviolet camera, the ultrasound camera, or the visible light camera. The quadrilateral module 626 may cause the processor 602 to identify a quadrilateral in the received image and to describe the quadrilateral (e.g., identify corners, edges, or the like).

The computer-readable medium 600 may include a correction calculation module 630. The correction calculation module 630 may cause the processor 602 to calculate a correction to the perspective distortion. For example, the correction calculation module 630 may cause the processor 602 to determine a transform that will cause a quadrilateral detected by the quadrilateral module 626 to be rectangular or that will cause a normal vector of the plane determined by the plane module 622 to point parallel to a direction into or out of the sensor. The correction calculation module 630 may cause the processor 602 adjust the correction to the perspective distortion based on the relative pose of the camera and the sensor.

The correction calculation module 630 may include a combination module 632. In an example, the correction calculation module 630 may cause the processor 602 to determine a first homographic transform based on a detected quadrilateral and a second homographic transform based on the best-fit function of a plane. The combination module 632 may cause the processor 602 to determine the perspective distortion based on combining the first homographic transform and the second homographic transform. For example, the combination module 632 may cause the processor 602 to determine an arithmetic or geometric mean, a median, or the like to combine a plurality of homographic transforms. The combination module 632 may cause the processor 602 to apply different weights to the plurality of homographic transforms when combining them. In some examples, the correction calculation module 630 may cause the processor 602 to determine a plurality of homographic transforms for a plurality of quadrilaterals identified in measurements from various cameras, a plurality of homographic transforms for a plurality of planes determined in measurements from various depth sensors, or the like for combination by the combination module 632.

The computer-readable medium 600 may include a correction application module 640. The correction application module 640 may cause the processor 602 to apply the correction to frames captured by the camera in substantially real-time with capturing of the frames. The correction application module 640 may cause the processor 602 to apply the correction in substantially real-time by applying a previous correction until an updated correction is received. The correction application module 640 may cause the processor 602 to apply the correction in substantially real-time by receiving updated corrections for each frame captured by the camera. In an example, the camera may include the computer-readable medium 600 or the processor 602 to provide for faster application of the corrections, calculation of the correction, determination of the distortion, or the like.

The computer-readable medium 600 may include a validation module 650. The validation module 650 may cause the processor 602 to detect a quadrilateral in a frame captured by the camera. The quadrilateral may be different from any quadrilaterals used to determine the distortion or calculate the correction. The validation module 650 may cause the processor 602 to validate the determination of the perspective distortion or the calculation of the correction based on the second quadrilateral. For example, the validation module 650 may cause the processor 602 to determine whether the output from the correction application module 640 includes a rectangle corresponding to the quadrilateral detected in the frame captured by the camera. Referring to FIG. 2, in an example, when executed by the processor 602, the measurement reception module 610 or the distortion determination module 620 may realize the pose engine 210; the correction calculation module 630 may realize the transform engine 220; the correction application module 640 may realize the correction engine 230; and the validation module 650 may realize the validation engine 240.

The above description is illustrative of various principles and implementations of the present disclosure. Numerous variations and modifications to the examples described herein are envisioned. Accordingly, the scope of the present application should be determined only by the following claims.

What is claimed is:

1. A system comprising:
a depth sensor to capture a captured frame;
a pose engine to:
detect a plane in the captured frame based on measurements from the depth sensor;
determine a pose of the depth sensor based on the detected plane; and
determine a pose of a camera based on the pose of the depth sensor;
a transform engine to determine a transform to apply to frames captured by the camera based on the pose of the camera; and
a correction engine to apply the transform to the frames captured by the camera in substantially real-time with capturing of the frames to correct a perspective distortion to the frames.

2. The system of claim 1, wherein the camera comprises the correction engine.

3. The system of claim 1, further comprising a further sensor to capture a further captured frame including a quadrilateral, wherein the pose engine is to determine a pose of the further sensor based on the quadrilateral detected in the further captured frame, and to further determine the pose of the camera based on the pose of the further camera.

4. The system of claim 3, wherein the camera is a visible light camera, and wherein the further sensor is an infrared camera.

5. The system of claim 3, wherein the pose engine is to determine the pose of the further sensor based on how much the quadrilateral deviates from a rectangle.

6. The system of claim 3, wherein the transform engine is to determine the transform that maps the quadrilateral to a rectangle.

7. A method, comprising:
detecting a change in a pose of a camera;
communicating with a depth sensor;
detecting a plane captured by the depth sensor based on measurements from the depth sensor;
determining a pose of the depth sensor based on the detected plane;
determining the pose of the camera relative to the pose of the depth sensor;
determining a perspective distortion based on the pose of the camera;
determining a correction for the perspective distortion for the camera based on the pose of the camera; and
correcting the perspective distortion in frames captured by the camera in substantially real-time with capturing of the frames.

8. The method of claim 7, wherein detecting the change in the pose of the camera comprises detecting the change using a sensor selected from the group consisting of an accelerometer, a gyroscope, a magnetometer, an infrared sensor, and a depth sensor.

9. The method of claim 7, wherein determining the correction for the perspective distortion comprises determining a transform to apply to the frames, and wherein correcting the perspective distortion in the frames comprises correcting the perspective distortion using the transform until an updated transform is determined in response to another change in the pose of the camera.

10. A non-transitory computer-readable medium comprising instructions that, when executed by a processor, cause the processor to:
receive measurements from a depth sensor;
determine a best-fit function of a plane based on the measurements from the depth sensor;
determine a perspective distortion of a camera resulting from a pose of the camera based on the best-fit function of the plane;
calculate a correction to the perspective distortion;
apply the correction to frames captured by the camera in substantially real-time with capturing of the frames.

11. The computer-readable medium of claim 10, wherein the instructions cause the processor to detect a first quadrilateral in an image; determine a first homographic transform based on the first quadrilateral and a second homographic transform based on the best-fit function of the plane; and determine the perspective distortion based on combining the first homographic transform and the second homographic transform.

12. The computer-readable medium of claim 11, wherein the image is from a sensor other than the camera, and wherein the instructions cause the processor to detect a second quadrilateral in a frame captured by the camera and validate the determination of the perspective distortion based on the second quadrilateral.

13. The computer-readable medium of claim 10, wherein the instructions cause the processor to segment measurements from the depth sensor to remove non-planar objects from the measurements.

14. The computer-readable medium of claim 10, wherein, to calculate a correction to the perspective distortion, the instructions cause the processor to: rotate the plane to have a normal vector parallel to a direction into or out of the camera.

* * * * *